United States Patent
Bai et al.

(10) Patent No.: US 11,346,648 B2
(45) Date of Patent: May 31, 2022

(54) ROTATION ANGLE DETECTION METHOD AND DEVICE THEREOF

(71) Applicant: UBTECH ROBOTICS CORP LTD, Shenzhen (CN)

(72) Inventors: Xi Bai, Shenzhen (CN); Wenhua Fan, Shenzhen (CN); Malin Wang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 238 days.

(21) Appl. No.: 16/626,519

(22) PCT Filed: Dec. 29, 2018

(86) PCT No.: PCT/CN2018/125770
§ 371 (c)(1),
(2) Date: Dec. 25, 2019

(87) PCT Pub. No.: WO2020/133471
PCT Pub. Date: Jul. 2, 2020

(65) Prior Publication Data
US 2021/0333082 A1    Oct. 28, 2021

(51) Int. Cl.
*G01B 5/24* (2006.01)
*H02P 21/18* (2016.01)
*G05B 19/416* (2006.01)

(52) U.S. Cl.
CPC .......... *G01B 5/24* (2013.01); *G05B 19/416* (2013.01); *H02P 21/18* (2016.02); *G05B 2219/41036* (2013.01)

(58) Field of Classification Search
CPC .................. G01B 5/24; G05B 2219/41036
See application file for complete search history.

(56) References Cited

U.S. PATENT DOCUMENTS

2015/0346261 A1 * 12/2015 Chen ............... G01R 31/52
361/93.6
2020/0101596 A1 * 4/2020 Ito ............... H02P 23/18
(Continued)

FOREIGN PATENT DOCUMENTS

CN    201725224 U    1/2011

OTHER PUBLICATIONS

ISR for PCT/CN2018/125770.
Written opinions of ISA for PCT/CN2018/125770.

*Primary Examiner* — Eman A Alkafawi

(57) ABSTRACT

The present invention provides a rotation angle detection method and device thereof. The method includes calculating an estimated value of a rotation angle of a motor shaft during rotation according to a second rotation angle; determining an actual range of the rotation angle according to the estimated value of the rotation angle and a detection error of the second angle sensor; determining optional values of the rotation angle based on a relative relationship between a first rotation angle and the estimated value; determining an actual rotation angle of the motor shaft, based on a value falling within the actual range of the rotation angle among the optional values, and determining an actual rotation angle of the output shaft according to the actual rotation angle of the motor shaft. The present invention can improve the measurement accuracy of the rotation angles of the output shaft of the rotating mechanism.

20 Claims, 5 Drawing Sheets

(56) References Cited

U.S. PATENT DOCUMENTS

2020/0180154 A1\* 6/2020 Tsuboi .................. B25J 9/10
2020/0205907 A1\* 7/2020 Doi ..................... B25J 9/102
2020/0368908 A1\* 11/2020 Mori ................... B25J 9/1674

\* cited by examiner

ROTATION ANGLE DETECTION METHOD AND DEVICE THEREOF

BACKGROUND

1. Technical Field

The present disclosure generally relates to measurement and control technology, and particularly to a rotation angle detection method and device thereof.

2. Description of Related Art

A servo is a position (angle) servo drive applied to a control system that needs to constantly change angles and can maintain the angles. One of the main tasks for the servo is to be able to accurately control rotation angles of the output shaft. The accuracy of the rotation angle control of the output shaft of the servo depends on the detection accuracy of the real-time rotation angle of the output shaft. That is to say, only on the premise of the real-time rotation angle of the output shaft being accurately calculated, the accurate control of the output shaft angle can be achieved by the control system.

A traditional method for detecting the angle of the output shaft of the servo is usually to directly detect the rotation angle of the output shaft by an angle sensor mounted on the output shaft of the servo. In this solution, the error of the angle sensor itself is directly introduced to the control of the rotation angle of the output shaft, and so it is difficult to bring accurate control effect.

SUMMARY

An embodiment of the present invention provides a rotation angle detection method and device thereof that can improve the measurement accuracy of rotation angles of an output shaft of a rotating mechanism, and make the output control of the rotating mechanism more accurate.

A rotation angle detection method, applied to the rotating mechanism. The rotating mechanism includes a motor shaft, a transmission part, and an output shaft. An output torque of the motor shaft acts on the output shaft through the transmission part and drives the output shaft to rotate. A first angle sensor is arranged on the motor shaft of the rotating mechanism for detecting a first rotation angle of the motor shaft, and a second angle sensor is arranged on the output shaft of the rotating mechanism for detecting a second rotation angle of the output shaft. The method includes:

calculating an estimated value of a rotation angle of the motor shaft during rotation according to the second rotation angle;

determining an actual range of the rotation angle of the motor shaft, according to the estimated value of the rotation angle and a detection error of the second angle sensor;

determining optional values of the rotation angle of the motor shaft, based on a relative relationship between the first rotation angle and the estimated value of the rotation angle; and determining an actual rotation angle of the motor shaft, based on a value falling within the actual range of the rotation angle of the motor shaft among the optional values of the rotation angle, and determining an actual rotation angle of the output shaft according to the actual rotation angle of the motor shaft.

Optionally, in one embodiment before the step of calculating the estimated, value of the rotation angle of the motor shaft during rotation according to the second rotation angle, further includes:

calculating a rotation angle corresponding relationship between the motor shaft and the output shaft, according to a transmission ratio of the transmission part;

determining an estimated rotation number of the motor shaft, based on the second rotation angle and the rotation angle corresponding relationship between the motor shaft and the output shaft; and determining an estimated value of a real-time rotation angle of the motor shaft, based on the second rotation angle and the rotation angle corresponding relationship between the motor shaft and the output shaft.

Optionally, in one embodiment, the step of calculating the estimated value of the rotation angle of the motor shall during rotation according to the second rotation angle, includes:

adding a product of the estimated rotation number and 360° to a product of the estimated value of the real-time rotation angle and the transmission ratio, and determining the estimated value of the rotation angle.

Optionally, in one embodiment, the step of determining the actual range of the rotation angle of the motor shaft, according to the estimated value of the rotation angle and the detection error of the second angle sensor, includes:

obtaining a measurement error value of the second angle sensor;

determining the actual range of the rotation angle of the motor shaft, according to a sum of the estimated value of the rotation angle and the measurement error value, and a difference between the estimated value of the rotation angle and the measurement error value.

Optionally, in one embodiment, the estimated value of the rotation angle includes an estimated rotation number, and an estimated value of the real-time rotation angle;

the step of determining the optional values of the rotation angle of the motor shaft, based on the relative relationship between the first rotation angle and the estimated value of the rotation angle, includes:

determining a corresponding relationship between the estimated rotation number and an actual rotation number of the motor shaft; and performing an angle value conversion according to the first rotation angle and the actual rotation number, and obtaining the optional values of the rotation angle.

Optionally, in one embodiment, the optional values of the rotation angle include: a first rotation angle, a second rotation angle, and a third rotation angle;

the step of determining the actual rotation angle of the motor shaft, based on the value filling within the actual range of the rotation angle of the motor shaft among the optional values of the rotation angle, includes:

calculating sizes of the first rotation angle, the second rotation angle and the third rotation angle, and determining any one of the optional values of the rotation angle falling within the actual range of the rotation angle of the motor shaft as the actual rotation angle of the motor shaft.

Optionally, in one embodiment, the step of determining the actual rotation angle of the output shaft according to the actual rotation angle of the motor shaft, includes:

obtaining a transmission ratio of the transmission part corresponding to the output torque of the motor shaft, dividing the actual rotation angle of the motor shaft by the transmission ratio, and obtaining the actual rotation angle of the output shaft.

A rotation angle detection device includes:

a rotation angle estimating module, configured for calculating an estimated value of a rotation angle of a motor shaft during rotation according to a second rotation angle;

an actual range determining module, configured for determining an actual range of the rotation angle of the motor shaft, according to the estimated value of the rotation angle and a detection error of the second angle sensor;

an angle calculating module, configured for determining optional values of the rotation angle of the motor shaft, based on a relative relationship between a first rotation angle and the estimated value of the rotation angle; and an angle selecting module, configured for determining an actual rotation angle of the motor shaft, based on a value falling within the actual range of the rotation angle of the motor shaft among the optional values of the rotation angle, and determining an actual rotation angle of the output shaft according to the actual rotation angle of the motor shaft.

A terminal includes a processor and a non-transitory storage storing computer programs which when executed by the processor cause the processor to perform steps of above method.

A non-transitory computer readable storage medium stores computer programs. When the computer programs are executed by a processor, steps of above method are performed.

Implementation of the embodiments of the present invention will have the following beneficial effects:

Above rotation angle detection method and device thereof by the first angle sensor arranged on the motor shaft of the rotating mechanism and used for detecting the first rotation angle of the motor shaft, the second angle sensor arranged on the output shaft of the rotating mechanism and used for detecting the second rotation angle of the output shaft, calculates the estimated value of the rotation angle of the motor shaft during rotation according to the second rotation angle; determines the actual range of the rotation angle of the motor shaft, according to the estimated value of the rotation angle and the detection error of the second angle sensor, determines the optional values of the rotation angle of the motor shaft, based on the relative relationship between the first rotation angle and the estimated value of the rotation angle; and determines the actual rotation angle of the motor shaft, based on the value falling within the actual range of the rotation angle of the motor shaft among the optional values of the rotation angle, and determines the actual rotation angle of the output shaft according to the actual rotation angle of the motor shaft. By the above method, the measurement accuracy of the rotation angles of the output shaft of the rotating mechanism can be improved, the influence on the overall error of the system caused by the accuracy error of the angle sensor is greatly reduced, and it makes the output control of the rotating mechanism more accurate.

BRIEF DESCRIPTION OF THE DRAWINGS

In order to more clearly describe the technical solution(s) of the embodiment(s) of the present invention, the drawings used in the descriptions of the embodiment(s) will be briefly introduced. Obviously, the following described drawings are merely some embodiments of the present invention. To those skilled in the art, other drawings may be obtained according to these drawings without creative work.

DETAILED DESCRIPTION

In order to make the purpose, technical solutions and advantages of the present application clearer, the present application is further described in detail below in combination with the drawings and embodiments. It should be understood that the specific embodiments described herein are used only to explain the present application, and are not used to limit the present application.

Unless otherwise defined, all technical and scientific terms used herein have the same meanings as generally understood by one of ordinary skill in the art of the present application. The terms used herein in the specification of the present application are only for the purpose of describing specific embodiments, and are not intended to limit the present application. It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present application. The first element and the second element are both elements, but they are not the same element.

Figure 1:
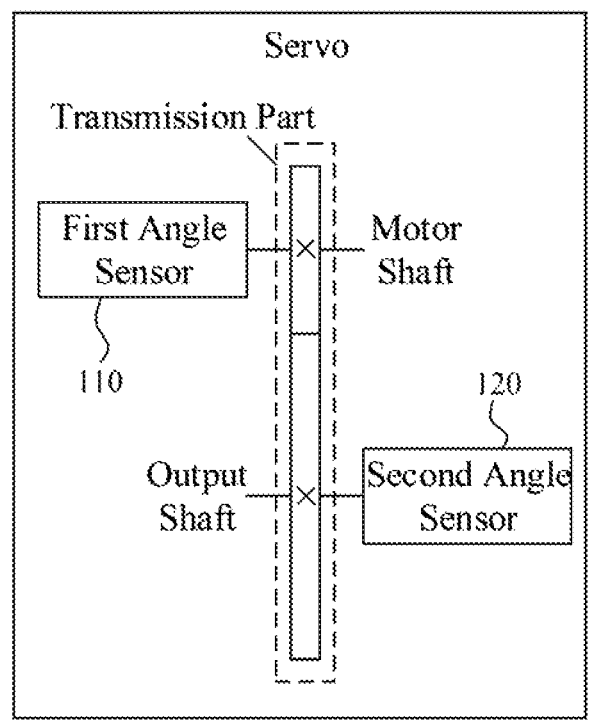
FIG. 1 is an application environment diagram of a rotation angle detection method according to one embodiment.

FIG. 1 is an application environment diagram of a rotation angle detection method according to one embodiment. The rotation angle detection method is applied to a rotating mechanism, the rotating mechanism may be a servo, and the rotating mechanism also may be other devices having a rotation shaft. As shown in FIG. 1, the servo includes a motor shaft, a transmission part, and an output shaft. An output torque of the motor shaft acts on the output shaft through the transmission part, and drives the output shaft to rotate. A first angle sensor 110 is arranged on the motor shaft of the servo for detecting a first rotation angle of the motor shaft. A second angle sensor 120 is arranged on the output shaft of the servo for detecting a second rotation angle of the output shaft.

Specifically, the angle sensors are connected to the transmission shaft and can cooperate with the transmission shaft. When the transmission shaft rotates, the angle sensors will automatically count.

Figure 2:
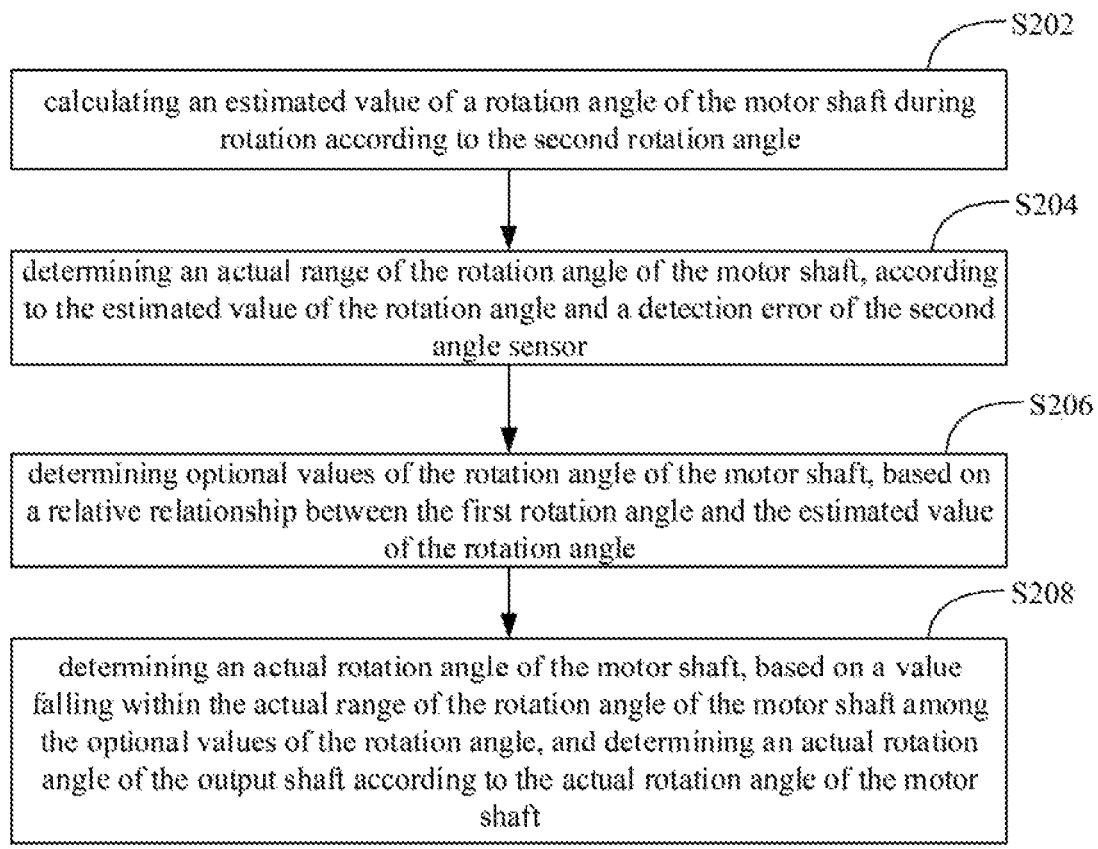
FIG. 2 is a schematic flow chart of the rotation angle detection method according to one embodiment.

FIG. 2 is a schematic flow chart of the rotation angle detection method according to one embodiment. The rotation angle detection method of the embodiment is described by taking an example of running on the servo shown in FIG. The rotation angle detection method can improve the measurement accuracy of the rotation angles of the output shaft of the rotating mechanism, and make the output control of the rotating mechanism more accurate. As shown in FIG. 2, the rotation angle detection method includes the following steps 202 to 208:

Step 202: calculating an estimated value of a rotation angle of the motor shaft during rotation according to the second rotation angle.

A second angle sensor is arranged on an output shaft of the servo, and can detect a second rotation angle of the output shaft. The estimated value of the rotation angle of the motor shaft during rotation refers to an accumulated rotation angle of the motor shaft.

After each rotation, the data returned by the angle sensor changes periodically, but the rotation number of the output shaft of the servo rotated from the starting position is usually not saved when the servo system stops working, so the estimated value of the rotation angle of the motor shaft during rotation can be calculated, based on a certain transmission ratio between the output shaft of the servo and the motor shaft, and by the second angle sensor detecting the second rotation angle of the output shaft. It ensures that the system can calculate the rotation number of the motor shaft in real time without saving the rotation number of the motor shaft.

Step 204: determining an actual range of the rotation angle of the motor shaft, according to the estimated value of the rotation angle and a detection error of the second angle sensor.

Since the second angle sensor itself has the detection error, the calculated estimated value of the rotation angle needs to consider a measurement error value of the second detection sensor. Specifically, the actual range of the rotation angle of the motor shaft can be determined, by calculating a sum of the estimated value of the rotation angle and the measurement error value, and calculating a difference between the estimated value of the rotation angle and the measurement error value.

Step 206: determining optional values of the rotation angle of the motor shaft, based on a relative relationship between the first rotation angle and the estimated value of the rotation angle.

A first angle sensor is arranged on the motor shaft of the servo, and can detect the first rotation angle of the motor shaft. The optional values of the rotation angle of the motor shaft refer to possibility values of a actual rotation angle of the motor shaft during rotation, and the optional values of the rotation angle fall within the actual range of the rotation angle of the motor shaft.

Specifically, there is an error±1 between a calculation result of the revolution number of the motor shaft and an actual value of the revolution number of the motor shaft, according to actual measurement data. That is, there is an error±1 between an actual revolution number of the motor shaft and an estimated revolution number of the motor shaft. Under the condition of considering the error, the possibility values of the actual rotation angle of the motor shaft during rotation can be determined.

Further, the actual rotation angle of the motor shaft can be determined by arranging the first angle sensor, and then the influence of the error of the angle sensor on the measurement accuracy of the rotation angle of the output shaft can be reduced by converting the rotation angle of the output shaft based on the transmission ratio of the transmission part.

Step 208: determining an actual rotation angle of the motor shaft, based on a value falling within the actual range of the rotation angle of the motor shaft among the optional values of the rotation angle, and determining an actual rotation angle of the output shaft according to the actual rotation angle of the motor shaft.

Among the optional values of the rotation angle of the motor shaft, there is only one value can fall within the actual range of the rotation angle of the motor shaft. Specifically, there is the error±1 between the calculation result of the revolution number of the motor shaft and the actual value of the revolution number of the motor shaft, but the actual rotation angle of the motor shaft is calculated according to the actual revolution number of the motor shaft and the first rotation angle of the motor shaft, so the optional values of the rotation angle of the motor shaft have three values in three cases, and the actual rotation angle of the motor shaft can be determined by determining an optional value of the rotation angle which falls within the actual range of the rotation angle of the motor shaft.

Further, the actual rotation angle of the output shaft can be obtained, by obtaining a transmission ratio of the transmission part corresponding to the output torque of the motor shaft and dividing the actual rotation angle of the motor shaft by the transmission ratio.

The rotation angle detection method of the embodiment, calculates the estimated value of the rotation angle of the motor shaft during rotation according to the second rotation angle; determines the actual range of the rotation angle of the motor shaft, according to the estimated value of the rotation angle and the detection error of the second angle sensor; determines the optional values of the rotation angle of the motor shaft, based on the relative relationship between the first rotation angle and the estimated value of the rotation angle; and determines the actual rotation angle of the motor shaft, based on the value falling within the actual range of the rotation angle of the motor shaft among the optional values of the rotation angle, and determines the actual rotation angle of the output shaft according to the actual rotation angle of the motor shaft. By the above method, the measurement accuracy of the rotation angles of the output shaft of the rotating mechanism can be improved, the influence on the overall error of the system caused by the accuracy error of the angle sensor is greatly reduced, and it makes the output control of the rotating mechanism more accurate.

Figure 3:
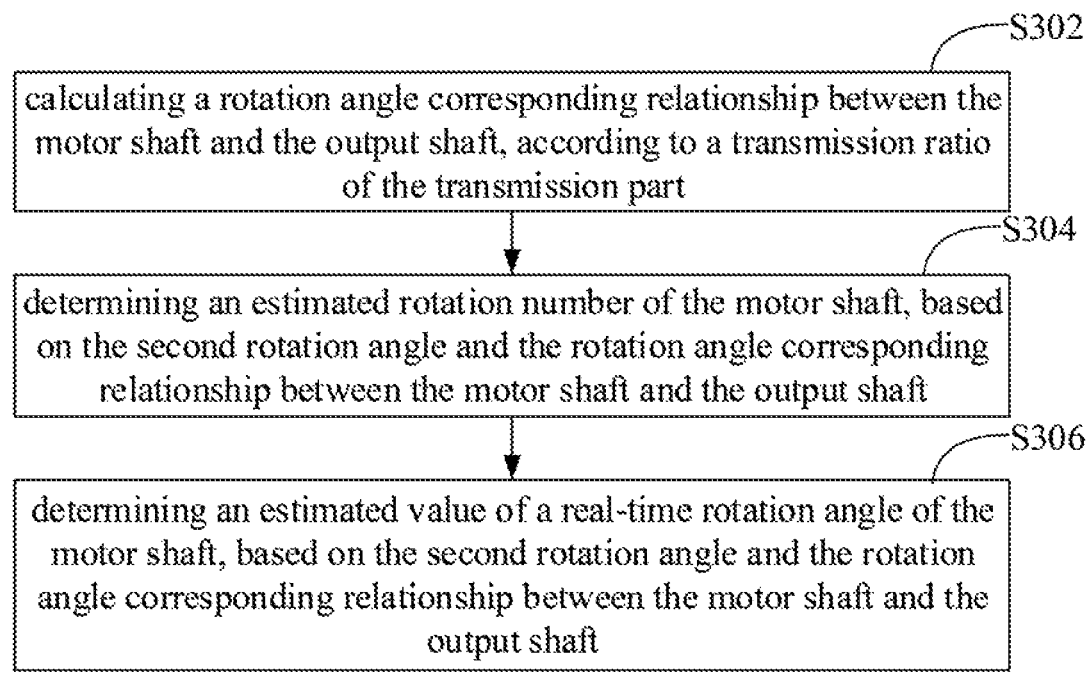
FIG. 3 is a schematic flow chart of the rotation angle detection method according to another embodiment.

As shown in FIG. 3, in one embodiment, before calculating the accumulated rotation angle of the motor shaft during rotation according to the second rotation angle, that is, before the step 202, further includes:

Step 302: calculating a rotation angle corresponding relationship between the motor shaft and the output shaft, according to a transmission ratio of the transmission part.

Specifically, the transmission part can be understood as a speed reduction mechanism, the rotating output of the motor shaft is mechanically transmitted through the speed reduction mechanism as an intermediate process, and finally becomes the rotating output of the output shaft of the servo. Each of the transmission parts has a certain transmission ratio, and the rotation angle corresponding relationship between the motor shaft and the output shaft can be calculated according to the transmission ratio.

Figure 4:
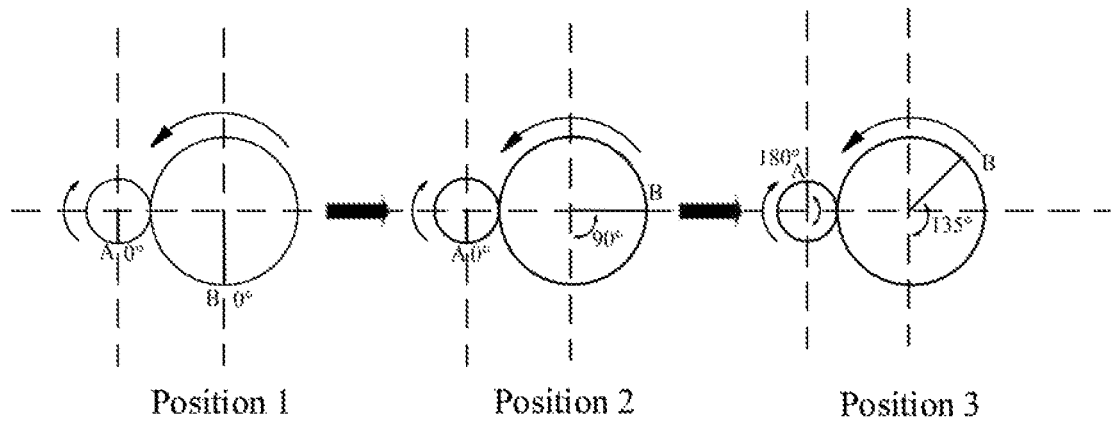
FIG. 4 is a diagram of a rotation angle corresponding relationship between a motor shaft and an output shaft according to one embodiment.

For example, as shown in FIG. 4, a diagram of the rotation angle corresponding relationship between the motor shaft and the output shaft according to one embodiment. In the figure, a small circle on the left is the motor shaft, and a big circle on the right is the output shaft, the transmission ratio of a transmission part N=4. In a state shown in position 1, the point A on the motor shaft and the point B on the output shaft are both on the position θ°; when the motor shaft rotates 360° in a clockwise direction, the point A returns to the zero position, and at the same time the output shaft rotates to the position 90° in a counterclockwise direction, that is, a state shown in position 2; when the motor shaft continues to rotate in the clockwise direction and rotates to angle 180, the point B rotates to 135°, that is, a state shown in position 3. With regard to a system with the transmission ratio of 4, every time the motor shaft rotates 360, the corresponding relation between the motor shaft and the rotation angle of the output shaft $$R_\theta = \frac{360°}{4} = 90°.$$

Step 304: determining an estimated rotation number of the motor shaft, based on the second rotation angle and the rotation angle corresponding relationship between the motor shaft and the output shaft.

For example, please continue to refer to FIG. 4, on position 3, the second angle sensor reading $\theta_f=135°$. A number of rotations of the motor shaft relative to the starting position at this time can be estimated preliminarily by $k'=INT(\theta_f/R_\theta)$, and $k'=INT(135/90)=1$ can be calculated. Wherein, k' is an integer portion of a value obtained by dividing the second angle sensor reading $\theta_f$ by $R_\theta$, that is, calculated estimated rotation number of the motor shaft relative to the initial position.

Step 306: determining an estimated value of a real-time rotation angle of the motor shaft, based on the second rotation angle and the rotation angle corresponding relationship between the motor shaft and the output shaft.

Wherein, the estimated value of the real-time rotation angle of the motor shaft refers to a calculated real-time rotation angle value of the motor shaft. Specifically, the estimated value of the real-time rotation angle of the motor shaft can be calculated, by calculating the remainder of a value obtained by dividing the second rotation angle by the corresponding relationship. For example, a parameter $M_\theta$ is introduced, $M_\theta$ is the remainder from dividing the second angle sensor reading $\theta_f$ by $R_\theta$, $M_\theta=\theta_f \mod R_\theta$.

The rotation angle detection method of the embodiment can improve the measurement accuracy of the rotation angles of the output shaft of the rotating mechanism, greatly reduce the influence on the overall error of the system caused by the accuracy error of the angle sensor, and make the output control of the rotating mechanism more accurate.

In one embodiment, calculating the estimated value of the rotation angle of the motor shaft during rotation according to the second rotation angle, that is, the step 202, includes: determining the estimated value of the rotation angle, by adding a product of the estimated rotation number and 360° to a product of the estimated value of the real-time rotation angle and the transmission ratio.

For example, by calculating the accumulated rotation angle of the motor shaft $\theta'_{rf}$ based on the second angle sensor reading $\theta_f$:

$$\begin{cases} k' = INT(\theta_f/R_\theta) \\ M_\theta = \theta_f \mod R_\theta \end{cases}.$$

$\theta'_{rf}=360\times k'+M_\theta*N$ can be calculated. Wherein, k' is the estimated rotation number of the motor shaft, $M_\theta$ is the estimated value of the real-time rotation angle of the motor shaft, and N is the transmission ratio.

Figure 5:
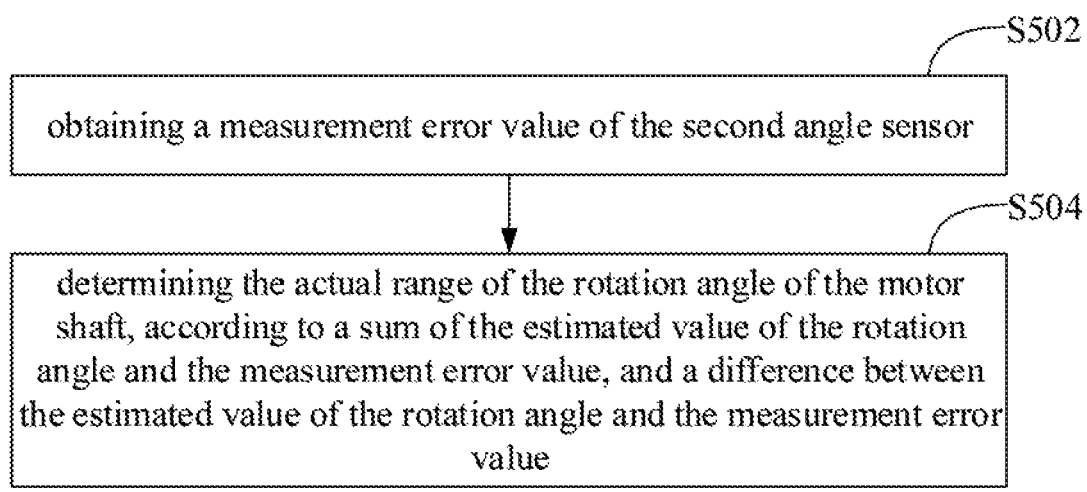
FIG. 5 is a schematic flow chart of the rotation angle detection method according to another embodiment.

As shown in FIG. 5, in one embodiment, determining an actual range of the rotation angle of the motor shaft, according to the estimated value of the rotation angle and the detection error of the second angle sensor, that is, the step 204 includes:

Step 502: obtaining a measurement error value of the second angle sensor.

Wherein, each angle sensor has a standard measurement error value at the factory, so the measurement error value of the second angle sensor can be obtained by querying the factory parameters of the sensor.

Step 504: determining the actual range of the rotation angle of the motor shaft, according to a sum of the estimated value of the rotation angle and the measurement error value, and a difference between the estimated value of the rotation angle and the measurement error value.

For example, under the case of considering the detection error of the second angle sensor, let the measurement error value of the second angle sensor be $\Delta_\theta$, the range of the actual rotation angle $\theta'_r$ of the motor shaft is:

$$(360\times k'+M_\theta*N-\Delta_\theta\times N)<\theta'_r<(360\times k'+M_\theta*N+\Delta_\theta\times N).$$

wherein, k' is the estimated rotation number of the motor shaft, $M_\theta$ is the estimated value of the real-time rotation angle of the motor shaft, N is the transmission ratio, and $\Delta_\theta$ is the measurement error value.

Figure 6:
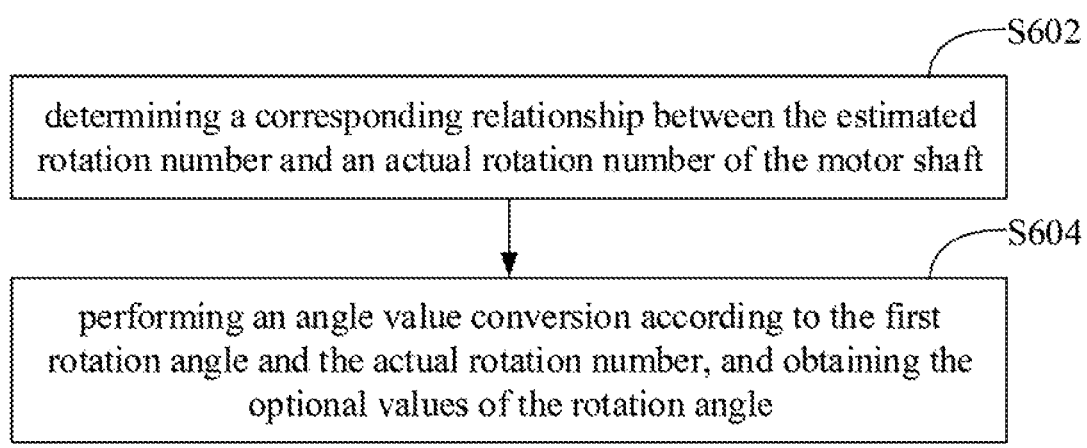
FIG. 6 is a schematic flow chart of the rotation angle detection method according to another embodiment.

As shown in FIG. 6, in one embodiment, determining the optional values of the rotation angle of the motor shaft, based on the relative relationship between the first rotation angle and the estimated value of the rotation angle, that is, the step 206 includes:

Step 602: determining a corresponding relationship between the estimated rotation number and an actual rotation number of the motor shaft.

Specifically, due to the angle sensor has the detection error, them is a possibility of deviation when the rotation number of the motor shaft is estimated based on the measurement value of the second angle sensor, and the measurement accuracy of the angle sensor can be determined by querying the factory parameters. The angle sensor is a precision instrument, and the detection error of the angle sensor is not too large usually.

For example, it is assume that the measurement accuracy of angle sensor is 1°, in the rotating mechanism with the transmission ratio N=4, the corresponding relation between the motor shaft and the rotation angle of the output shaft for every 360° rotation of the motor shaft $$R_\theta = \frac{360°}{4} = 90°.$$

When the output shaft is actually rotated to the position 180°, considering the detection error of the second angle sensor, the output shaft reading may be 179°~181°. If the second angle sensor reading is 179° at this time, the estimated rotation number is 1 calculated by $k'=INT(\theta_f/R_\theta)$, the difference between the calculated estimated rotation number and the actual rotation number 2 is −1. Similarly, when the output shaft is actually rotated to the position 179°, considering the detection error of the second angle sensor, the output shaft reading may be 178°~180°. If the second angle sensor reading is 180° at this time, the estimated rotation number is 2 calculated by $k'=INT(\theta_f/R_\theta)$, the difference between the calculated estimated rotation number and the actual rotation number 1 is 1.

Accordingly, within the following ranges:

$$\begin{cases} (P\times R_\theta-\Delta_\theta)<\theta_r<(P\times R_\theta) \\ (P\times R_\theta)<\theta_r<(P\times R_\theta+\Delta_\theta) \end{cases}.$$

Wherein, P is an arbitrary integer. There is an error±1 between the calculation result of the rotation number of the motor shaft and the actual value of the rotation number of the motor shaft, that is, there is an error±1 between the actual rotation number of the motor shaft and the estimated rotation number of the motor shaft. That is, there are three possible corresponding relations between the actual rotation number k of the motor shaft and the estimated rotation number k' of the motor shaft: k=k'−1, k=k', k=k'+1.

Step 604: performing an angle value conversion according to the first rotation angle and the actual rotation number, and obtaining the optional values of the rotation angle.

Under the condition of considering the error, the possibility values of the actual rotation angle of the motor shaft during rotation can be determined. For example, the actual rotation angle of the motor shaft $\theta'_r$ is calculated based on the first angle sensor reading $\theta'_f$:

$$\theta'_r = 360 \times k + \theta'_f.$$

Wherein, k is the actual rotation number of the motor shaft, the three corresponding relations between the actual rotation number k of the motor shaft and the estimated rotation number k' of the motor shaft are substituted into the $\theta'_r = 360 \times k + \theta'_f$, and three possible values θ1, θ2, θ3 corresponding to $\theta'_r$ are obtained.

In one embodiment, determining the actual rotation angle of the motor shaft, based on the value falling within the actual range of the rotation angle of the motor shaft among the optional values of the rotation angle, that is, the step 208 includes: calculating a size of the first rotation angle, a size of the second rotation angle and a size of the third rotation angle, and determining any one of the optional values of the rotation angle falling within the actual range of the rotation angle of the motor shaft as the actual rotation angle of the motor shaft.

Specifically, the optional values of the rotation angle include the first rotation angle, the second rotation angle, and the third rotation angle, which respectively indicate estimated rotation numbers and actual rotation numbers of the motor shaft in three different situations. There is only one rotation angle among the optional values of the rotation angle which can fall within the actual range of the rotation angle of the motor shaft. Any one of the optional values of the rotation angle falling within the actual range of the rotation angle of the motor shaft is determined as the actual rotation angle of the motor shaft.

In one embodiment, determining the actual rotation angle of the output shaft according to the actual rotation angle of the motor shaft, that is, the step 208 further includes: obtaining a transmission ratio of the transmission part corresponding to the output torque of the motor shaft, dividing the actual rotation angle of the motor shaft by the transmission ratio, and obtaining the actual rotation angle of the output shaft.

When the actual rotation angle of the motor shaft is determined, at this time, a rotation number corresponding to this determined value is the accurate rotation number, and the corresponding calculated rotation angle of the output shaft is also the accurate rotation angle of the output shaft. For example, according to formula:

$$\theta_r = \theta'_r / N.$$

the actual rotation angle of the output shaft is calculated, wherein, $\theta'_r$ is the actual rotation angle of the motor shaft, and N is the transmission ratio.

Due to the error value of the first angle sensor, a rotation angle error±$\Delta_\theta$ may introduced into the actual rotation angle of the motor shaft. At the output end, due to the transmission mechanism having a transmission ratio, the rotation angle error is reduced to ±($\Delta_\theta$/N). Accordingly, the influence on the overall error of the system caused by the accuracy error of the angle sensor is greatly reduced, and the rotating mechanism can achieve higher control accuracy, by the rotation angle detection method.

Above rotation angle detection method can improve the measurement accuracy of the rotation angles of the output shaft of the rotating mechanism, greatly reduce the influence on the overall error of the system caused by the accuracy error of the angle sensor, and make the output control of the rotating mechanism more accurate.

It should be understood that although steps in the above-mentioned FIGS. 2-3 and FIGS. 4-6 are sequentially displayed following the arrows, these steps are not necessarily performed sequentially in the order indicated by the arrows. Unless explicitly stated in this article, there are no strict sequence restrictions on the execution of these steps, and these steps can be performed in other sequences. Moreover, at least a part of the steps in FIGS. 2-3 and FIGS. 4-6 may include a plurality of sub-steps or stages. These sub-steps or stages am not necessarily completed at the same time, but can be performed at different times. The execution order of these sub-steps or stages is not necessarily performed sequentially, but can be performed in turn or alternately with at least a part of the sub-steps or phases of other steps or other steps.

Figure 7:
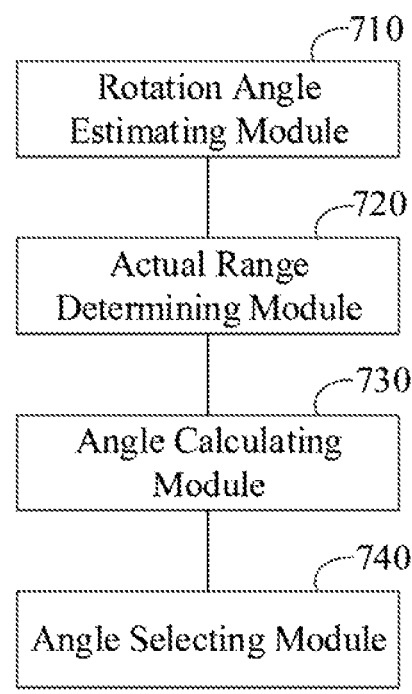
FIG. 7 is a block diagram of a rotation angle detection device to one embodiment.

As shown in FIG. 7, in one embodiment, a rotation angle detection device is provided. The rotation angle detection device includes: a rotation angle estimating module 710, an actual range determining module 720, an angle calculating module 730, and an angle selecting module 740.

The rotation angle estimating module 710 is used for calculating an estimated value of a rotation angle of a motor shaft during rotation according to a second rotation angle.

The actual range determining module 720 is used for determining an actual range of the rotation angle of the motor shaft, according to the estimated value of the rotation angle and a detection error of the second angle sensor.

The angle calculating module 730 is used for determining optional values of the rotation angle of the motor shaft, based on a relative relationship between a first rotation angle and the estimated value of the rotation angle.

The angle selecting module 740 is used for determining an actual rotation angle of the motor shaft, based on a value falling within the actual range of the rotation angle of the motor shaft among the optional values of the rotation angle, and determining an actual rotation angle of the output shaft according to the actual rotation angle of the motor shaft.

Above rotation angle detection device can improve the measurement accuracy of the rotation angles of the output shaft of the rotating mechanism, greatly reduce the influence on the overall error of the system caused by the accuracy error of the angle sensor, and make the output control of the rotating mechanism more accurate.

For the specific definition of the rotation angle detection device, please refer to the above definition of the rotation angle detection method, and the details are not described herein again. Each of the modules in the rotation angle detection device above can be realized in whole or in part by software, hardware and their combination. Each of the above modules can be embedded in or independent of the processor in the computer device in the form of hardware, or can be stored in the memory of the computer device in the form of software, so that the processor can call and execute the operations corresponding to the above modules.

Each of the modules of the rotation angle detection device in the embodiment of the present application can be realized in the form of computer programs. The computer programs can be run on a terminal or server. The program module composed of the computer programs can be stored on the memory of the terminal or the server. When the computer programs are executed by the processor, the steps of the rotation angle detection method as described in the embodiment can be performed.

The embodiment of the present application further provides a terminal, and the terminal includes a processor and a non-transitory storage storing computer programs which when executed by the processor cause the processor to perform steps of the rotation angle detection method as described in above embodiments.

The embodiment of the present application further provides a non-transitory computer readable storage medium. The non-transitory computer readable storage medium includes one or more computer executable instructions. When the computer executable instruction is executed by one or more processors, one or more processors are caused to perform the rotation angle detection method as described in above embodiments.

The embodiment of the present application further provides a computer program product. The computer program product includes instructions, and when the computer program product is running on the computer, the computer is caused to perform the rotation angle detection method as described in above embodiments.

All or part of above embodiments may be implemented by software, hardware, firmware, or any combination thereof. When it is implemented by a software program, it may be implemented in whole or in part in the form of a computer program product. The computer program product includes one or more computer instructions. When the computer program instructions are loaded and executed on a computer, the processes or functions are wholly or partially generated according to the embodiments of the present invention. The computer may be a general-purpose computer, a special-purpose computer, a computer network, or other programmable devices. The computer instructions may be stored in a computer-readable storage medium, or are transmitted from one computer-readable storage medium to another computer-readable storage medium. The computer-readable storage medium may be any available medium that can be accessed by a computer, or a data storage device such as a server, a data center, or the like that includes one or more available medium integration. The available medium may be a magnetic medium (for example, a floppy disk, a hard disk, a magnetic tape), an optical medium (for example, a DVD), or a semiconductor medium (for example, a Solid State Disk (SSD)), etc.

The above description is merely the better embodiments in the present disclosure, the claim is not limited to the description thereby. Therefore, the equivalent changes made according to the claims of the present invention still fall within the scope of the present invention.

What is claimed is:

1. A rotation angle detection method, applied to a rotating mechanism comprising a motor shaft, a transmission part, and an output shaft, an output torque of the motor shaft acting on the output shaft through the transmission part, and driving the output shaft to rotate, wherein a first angle sensor is arranged on the motor shaft of the rotating mechanism for detecting a first rotation angle of the motor shaft, a second angle sensor is arranged on the output shaft of the rotating mechanism for detecting a second rotation angle of the output shaft; the method comprising:

calculating an estimated value of a rotation angle of the motor shaft during rotation according to the second rotation angle;

determining an actual range of the rotation angle of the motor shaft, according to the estimated value of the rotation angle and a detection error of the second angle sensor;

determining optional values of the rotation angle of the motor shaft, based on a relative relationship between the first rotation angle and the estimated value of the rotation angle; and determining an actual rotation angle of the motor shaft, based on a value falling within the actual range of the rotation angle of the motor shaft among the optional values of the rotation angle, and determining an actual rotation angle of the output shaft according to the actual rotation angle of the motor shaft;

wherein before the step of calculating the estimated value of the rotation angle of the motor shaft during rotation according to the second rotation angle, further comprises:

calculating a rotation angle corresponding relationship between the motor shaft and the output shaft, according to a transmission ratio of the transmission part;

determining an estimated rotation number of the motor shaft, based on the second rotation angle and the rotation angle corresponding relationship between the motor shaft and the output shaft; and determining an estimated value of a real-time rotation angle of the motor shaft, based on the second rotation angle and the rotation angle corresponding relationship between the motor shaft and the output shaft; and wherein the step of calculating the estimated value of the rotation angle of the motor shaft during rotation according to the second rotation angle comprises:

determining the estimated value of the rotation angle by adding a product of the estimated rotation number and 360° to a product of the estimated value of the real-time rotation angle and the transmission ratio.

2. The method as claimed in claim 1, wherein the step of determining the actual range of the rotation angle of the motor shaft, according to the estimated value of the rotation angle and the detection error of the second angle sensor, comprises:

obtaining a measurement error value of the second angle sensor;

determining the actual range of the rotation angle of the motor shaft, according to a sum of the estimated value of the rotation angle and the measurement error value, and a difference between the estimated value of the rotation angle and the measurement error value.

3. The method as claimed in claim 1, wherein the estimated value of the rotation angle comprises an estimated rotation number, and an estimated value of the real-time rotation angle;

the step of determining the optional values of the rotation angle of the motor shaft, based on the relative relationship between the first rotation angle and the estimated value of the rotation angle, comprises:

determining a corresponding relationship between the estimated rotation number and an actual rotation number of the motor shaft; and performing an angle value conversion according to the first rotation angle and the actual rotation number, and obtaining the optional values of the rotation angle.

4. The method as claimed in claim 3, wherein the optional values of the rotation angle comprise: a first rotation angle, a second rotation angle, and a third rotation angle;
the step of determining the actual rotation angle of the motor shaft, based on the value falling within the actual range of the rotation angle of the motor shaft among the optional values of the rotation angle, comprises:
calculating sizes of the first rotation angle, the second rotation angle and the third rotation angle, and determining any one of the optional values of the rotation angle falling within the actual range of the rotation angle of the motor shaft as the actual rotation angle of the motor shaft.

5. The method as claimed in claim 1, wherein the step of determining the actual rotation angle of the output shaft according to the actual rotation angle of the motor shaft, comprises:
obtaining a transmission ratio of the transmission part corresponding to the output torque of the motor shaft, dividing the actual rotation angle of the motor shaft by the transmission ratio, and obtaining the actual rotation angle of the output shaft.

6. A rotation angle detection device, comprising:
a rotation angle estimating module, configured for calculating an estimated value of a rotation angle of a motor shaft during rotation according to a second rotation angle;
an actual range determining module, configured for determining an actual range of the rotation angle of the motor shaft, according to the estimated value of the rotation angle and a detection error of the second angle sensor;
an angle calculating module, configured for determining optional values of the rotation angle of the motor shaft, based on a relative relationship between a first rotation angle and the estimated value of the rotation angle, and
an angle selecting module, configured for determining an actual rotation angle of the motor shaft, based on a value falling within the actual range of the rotation angle of the motor shaft among the optional values of the rotation angle, and determining an actual rotation angle of the output shaft according to the actual rotation angle of the motor shaft;
wherein before calculating the estimated value of the rotation angle of the motor shaft during rotation according to the second rotation angle, the rotation angle estimating module is further configured for:
calculating a rotation angle corresponding relationship between the motor shaft and the output shaft, according to a transmission ratio of the transmission part;
determining an estimated rotation number of the motor shaft, based on the second rotation angle and the rotation angle corresponding relationship between the motor shaft and the output shaft; and
determining an estimated value of a real-time rotation angle of the motor shaft, based on the second rotation angle and the rotation angle corresponding relationship between the motor shaft and the output shaft; and
wherein calculating the estimated value of the rotation angle of the motor shaft during rotation according to the second rotation angle, comprises:
determining the estimated value of the rotation angle, by adding a product of the estimated rotation number and 360° to a product of the estimated value of the real-time rotation angle and the transmission ratio.

7. A terminal, wherein the terminal comprises a processor and a non-transitory storage storing computer programs which when executed by the processor cause the processor to perform steps of the method of claim 1.

8. A non-transitory computer readable storage medium storing computer programs, wherein when the computer programs are executed by a processor, steps of the method of claim 1 are performed.

9. The rotation angle detection device as claimed in claim 6, wherein determining the actual range of the rotation angle of the motor shaft, according to the estimated value of the rotation angle and the detection error of the second angle sensor, comprises:
obtaining a measurement error value of the second angle sensor; and
determining the actual range of the rotation angle of the motor shaft, according to a sum of the estimated value of the rotation angle and the measurement error value, and a difference between the estimated value of the rotation angle and the measurement error value.

10. The rotation angle detection device as claimed in claim 6, wherein the estimated value of the rotation angle comprises an estimated rotation number, and an estimated value of the real-time rotation angle; and
wherein determining the optional values of the rotation angle of the motor shaft, based on the relative relationship between the first rotation angle and the estimated value of the rotation angle, comprises:
determining a corresponding relationship between the estimated rotation number and an actual rotation number of the motor shaft; and
performing an angle value conversion according to the first rotation angle and the actual rotation number, and obtaining the optional values of the rotation angle.

11. The rotation angle detection device as claimed in claim 10, wherein the optional values of the rotation angle comprise: a first rotation angle, a second rotation angle, and a third rotation angle; and
wherein determining the actual rotation angle of the motor shaft, based on the value falling within the actual range of the rotation angle of the motor shaft among the optional values of the rotation angle, comprises:
calculating sizes of the first rotation angle, the second rotation angle and the third rotation angle, and determining any one of the optional values of the rotation angle falling within the actual range of the rotation angle of the motor shaft as the actual rotation angle of the motor shaft.

12. The rotation angle detection device as claimed in claim 6, wherein determining the actual rotation angle of the output shaft according to the actual rotation angle of the motor shaft, comprises:
obtaining a transmission ratio of the transmission part corresponding to the output torque of the motor shaft, dividing the actual rotation angle of the motor shaft by the transmission ratio, and Obtaining the actual rotation angle of the output shaft.

13. The terminal as claimed in claim 7, wherein the step of determining the actual range of the rotation angle of the motor shaft, according to the estimated value of the rotation angle and the detection error of the second angle sensor, comprises:
obtaining a measurement error value of the second angle sensor;

determining the actual range of the rotation angle of the motor shaft, according to a sum of the estimated value of the rotation angle and the measurement error value, and a difference between the estimated value of the rotation angle and the measurement error value.

14. The terminal as claimed in claim 7, wherein the estimated value of the rotation angle comprises an estimated rotation number, and an estimated value of the real-time rotation angle;
the step of determining the optional values of the rotation angle of the motor shaft, based on the relative relationship between the first rotation angle and the estimated value of the rotation angle, comprises:
determining a corresponding relationship between the estimated rotation number and an actual rotation number of the motor shaft; and
performing an angle value conversion according to the first rotation angle and the actual rotation number, and obtaining the optional values of the rotation angle.

15. The terminal as claimed in claim 14, wherein the optional values of the rotation angle comprise: a first rotation angle, a second rotation angle, and a third rotation angle;
the step of determining the actual rotation angle of the motor shaft, based on the value falling within the actual range of the rotation angle of the motor shaft among the optional values of the rotation angle, comprises:
calculating sizes of the first rotation angle, the second rotation angle and the third rotation angle, and determining any one of the optional values of the rotation angle falling within the actual range of the rotation angle of the motor shaft as the actual rotation angle of the motor shaft.

16. The terminal as claimed in claim 7, wherein the step of determining the actual rotation angle of the output shaft according to the actual rotation angle of the motor shaft, comprises:
obtaining a transmission ratio of the transmission part corresponding to the output torque of the motor shaft, dividing the actual rotation angle of the motor shaft by the transmission ratio, and obtaining the actual rotation angle of the output shaft.

17. The non-transitory computer readable storage medium as claimed in claim 8, wherein the step of determining the actual range of the rotation angle of the motor shaft, according to the estimated value of the rotation angle and the detection error of the second angle sensor, comprises:

obtaining a measurement error value of the second angle sensor; and
determining the actual range of the rotation angle of the motor shaft, according to a sum of the estimated value of the rotation angle and the measurement error value, and a difference between the estimated value of the rotation angle and the measurement error value.

18. The non-transitory computer readable storage medium as claimed in claim 8, wherein the estimated value of the rotation angle comprises an estimated rotation number, and an estimated value of the real-time rotation angle;
the step of determining the optional values of the rotation angle of the motor shaft, based on the relative relationship between the first rotation angle and the estimated value of the rotation angle, comprises:
determining a corresponding relationship between the estimated rotation number and an actual rotation number of the motor shaft; and
performing an angle value conversion according to the first rotation angle and the actual rotation number, and obtaining the optional values of the rotation angle.

19. The non-transitory computer readable storage medium as claimed in claim 18, wherein the optional values of the rotation angle comprise: a first rotation angle, a second rotation angle, and a third rotation angle;
the step of determining the actual rotation angle of the motor shaft, based on the value falling within the actual range of the rotation angle of the motor shaft among the optional values of the rotation angle, comprises:
calculating sizes of the first rotation angle, the second rotation angle and the third rotation angle, and determining any one of the optional values of the rotation angle falling within the actual range of the rotation angle of the motor shaft as the actual rotation angle of the motor shaft.

20. The non-transitory computer readable storage medium as claimed in claim 8, wherein the step of determining the actual rotation angle of the output shaft according to the actual rotation angle of the motor shaft, comprises:
obtaining a transmission ratio of the transmission part corresponding to the output torque of the motor shaft, dividing the actual rotation angle of the motor shaft by the transmission ratio, and Obtaining the actual rotation angle of the output shaft.

* * * * *